US 9,546,604 B2

(12) United States Patent
Clauson et al.

(10) Patent No.: US 9,546,604 B2
(45) Date of Patent: Jan. 17, 2017

(54) TRANSIENT FAULT DETECTION METHODS AND SYSTEMS

(71) Applicant: United Technologies Corporation, Hartford, CT (US)

(72) Inventors: Jesse W. Clauson, Agawam, MA (US); Eric E. Legg, Suffield, CT (US)

(73) Assignee: UNITED TECHNOLOGIES CORPORATION, Hartford, CT (US)

( * ) Notice: Subject to any disclaimer, the term of this patent is extended or adjusted under 35 U.S.C. 154(b) by 211 days.

(21) Appl. No.: 14/592,463

(22) Filed: Jan. 8, 2015

(65) Prior Publication Data

US 2016/0201572 A1    Jul. 14, 2016

(51) Int. Cl.

| F02C 9/18 | (2006.01) |
|---|---|
| G01M 3/28 | (2006.01) |
| F15B 19/00 | (2006.01) |
| F16K 37/00 | (2006.01) |
| F15B 20/00 | (2006.01) |

(52) U.S. Cl.
CPC ............... *F02C 9/18* (2013.01); *F15B 19/005* (2013.01); *F15B 20/008* (2013.01); *F16K 37/0091* (2013.01); *G01M 3/2876* (2013.01)

(58) Field of Classification Search
CPC .......... F02C 9/18; G01M 3/28; G01M 3/2876; F15B 19/005; F15B 20/008; F16K 37/0091
See application file for complete search history.

(56) References Cited

U.S. PATENT DOCUMENTS

| 5,713,240 | A | 2/1998 | Engelmann | |
|---|---|---|---|---|
| 2003/0135334 | A1 | 7/2003 | Engelmann | |
| 2006/0180128 | A1* | 8/2006 | Saito | F02D 41/221 123/525 |
| 2010/0151343 | A1* | 6/2010 | Katano | H01M 8/04089 429/444 |
| 2012/0031499 | A1* | 2/2012 | Scott | F16K 31/046 137/14 |

FOREIGN PATENT DOCUMENTS

JP         2001041106  A  *  2/2001  ............. F02D 41/22

OTHER PUBLICATIONS

Extended European Search Report dated Jun. 8, 2016 in European Application No. 16150336.2.

* cited by examiner

*Primary Examiner* — Nguyen Ha
(74) *Attorney, Agent, or Firm* — Snell & Wilmer L.L.P.

(57) ABSTRACT

The present disclosure provides methods, systems, and computer-readable media for the detection of valve faults based on transient air pressure measurements. For example, a method for fault detection may comprise actuating a shut off valve to an open position, determining a first air pressure of air in an enclosed space at a first time, determining a second air pressure of the air in the enclosed space at a second time and in response to actuation of the shut off valve to an open position, subtracting the first air pressure and the second air pressure to obtain an actual pressure difference, comparing the actual pressure difference to a predetermined pressure difference, and determining, based on the transient comparison, whether at least one of the shut off valve and a check valve is in a failed state.

20 Claims, 8 Drawing Sheets

TRANSIENT FAULT DETECTION METHODS AND SYSTEMS

FIELD OF THE DISCLOSURE

The present disclosure relates to fault detection systems and methods, and more particularly, to detecting valve failures in a buffer air system.

BACKGROUND OF THE DISCLOSURE

Gas turbine engines typically include at least a compressor section, a combustor section, and a turbine section. Such engines may also include a buffer air system. In a buffer air system, multiple bleed ports are regulated by valves and communicate air from the compressor sections to a manifold, from which buffer supply air may be communicated to other portions of the engine or released externally from the engine.

Buffer air systems and mechanical systems in general may fail. The failure of buffer air system valves may impede the proper functioning of the gas turbine engine, as well as systems the engine may power.

SUMMARY OF THE DISCLOSURE

In various embodiments, the present disclosure provides methods, systems, and computer-readable media for the detection of valve faults based on air pressure measurements.

In various embodiments, the present disclosure provides methods and systems of detecting valve failures. These systems may be used to measure air pressure changes over time in an enclosed space, compare such pressure changes to predetermined or calculated values, and on the basis of such comparisons, determine whether valves are in a failed state.

In various embodiments, a computer-readable medium may cause a computer-based controller to perform operations including measuring air pressure with an air pressure sensor. The operations may include determining that a buffer air system failure has occurred. The operations may further include indicating that the buffer air system failure has occurred with a fault indicator.

BRIEF DESCRIPTION OF THE DRAWINGS

The accompanying drawings are included to provide a further understanding of the present disclosure and are incorporated in, and constitute a part of, this specification, illustrate various embodiments, and together with the description, serve to explain the principles of the disclosure.

DETAILED DESCRIPTION

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, electrical, and mechanical changes may be made without departing from the spirit and scope of the disclosure. Thus, the detailed description herein is presented for purposes of illustration only and not of limitation.

For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact.

For example, in the context of the present disclosure, methods, systems, and articles may find particular use in connection with gas turbine engines. However, various aspects of the disclosed embodiments may be adapted for optimized performance in a variety of engines, buffer air systems, and valve-regulated pressurized systems. As such, numerous applications of the present disclosure may be realized.

Figure 1:
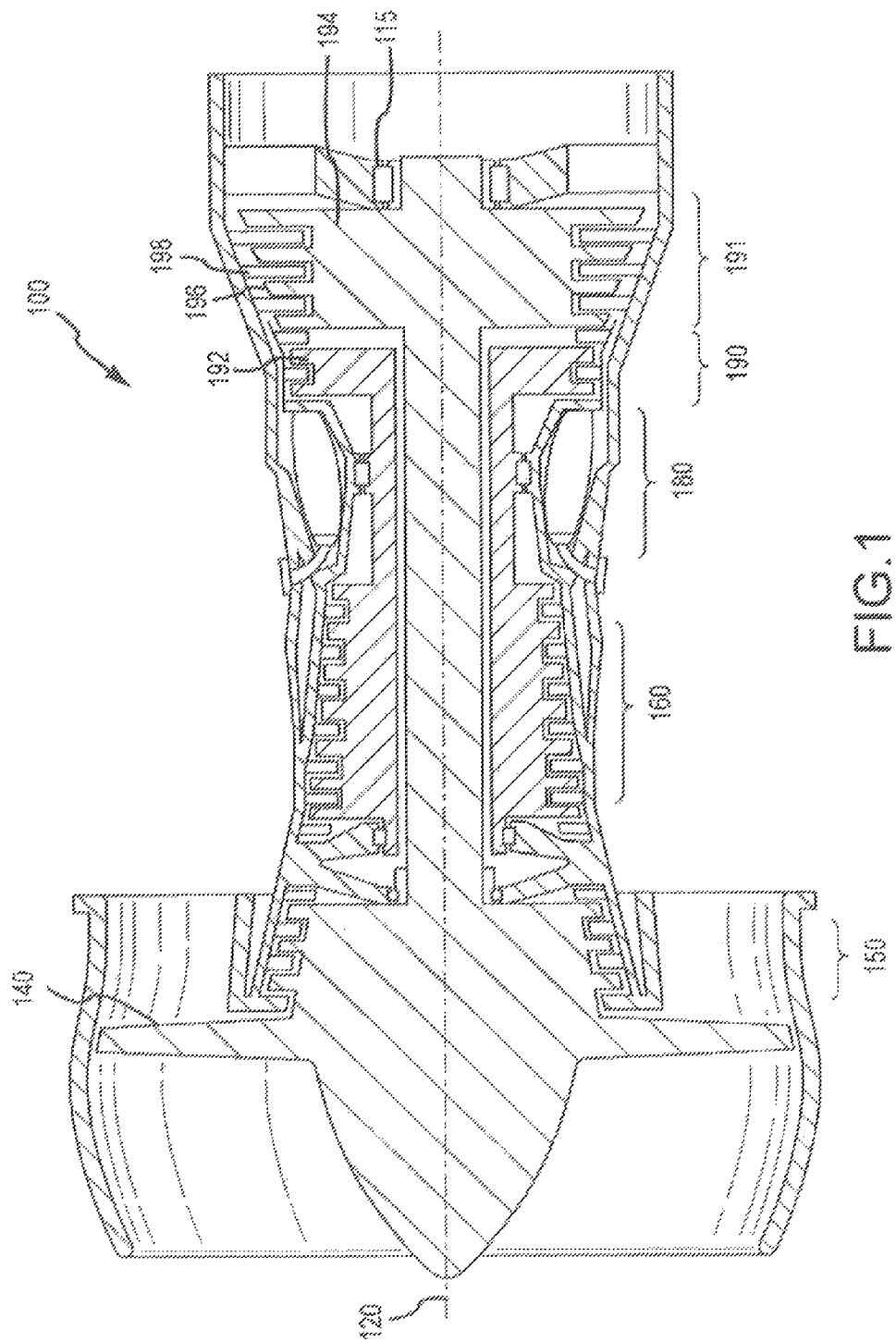
FIG. 1 illustrates a schematic cross-section view of a gas turbine engine in accordance with various embodiments.

Referring to FIG. 1, a gas turbine engine 100 (such as a turbofan gas turbine engine) is illustrated according to various embodiments. Gas turbine engine 100 is disposed about axial centerline axis 120, which may also be referred to as axis of rotation 120. Gas turbine engine 100 may comprise a fan 140, compressor sections 150 and 160, a combustion section 180, and turbine sections 190, 191. The fan 140 may drive air into compressor sections 150, 160, which further drive air along a core flow path for compression and communication into the combustion section 180. Air compressed in the compressor sections 150, 160 may be mixed with fuel and burned in combustion section 180 and expanded across the turbine sections 190, 191. The turbine sections 190, 191 may include high pressure rotors 192 and low pressure rotors 194, which rotate in response to the expansion. The turbine sections 190, 191 may comprise alternating rows of rotary airfoils or blades 196 and static airfoils or vanes 198. Cooling air may be supplied to the turbine sections 190, 191 from the compressor sections 150, 160. A plurality of bearings 115 may support spools in the gas turbine engine 100. FIG. 1 provides a general understanding of the sections in a gas turbine engine, and is not intended to limit the disclosure. The present disclosure may extend to all types of applications and to all types of turbine engines, including turbofan gas turbine engines and turbojet engines.

Figure 2:
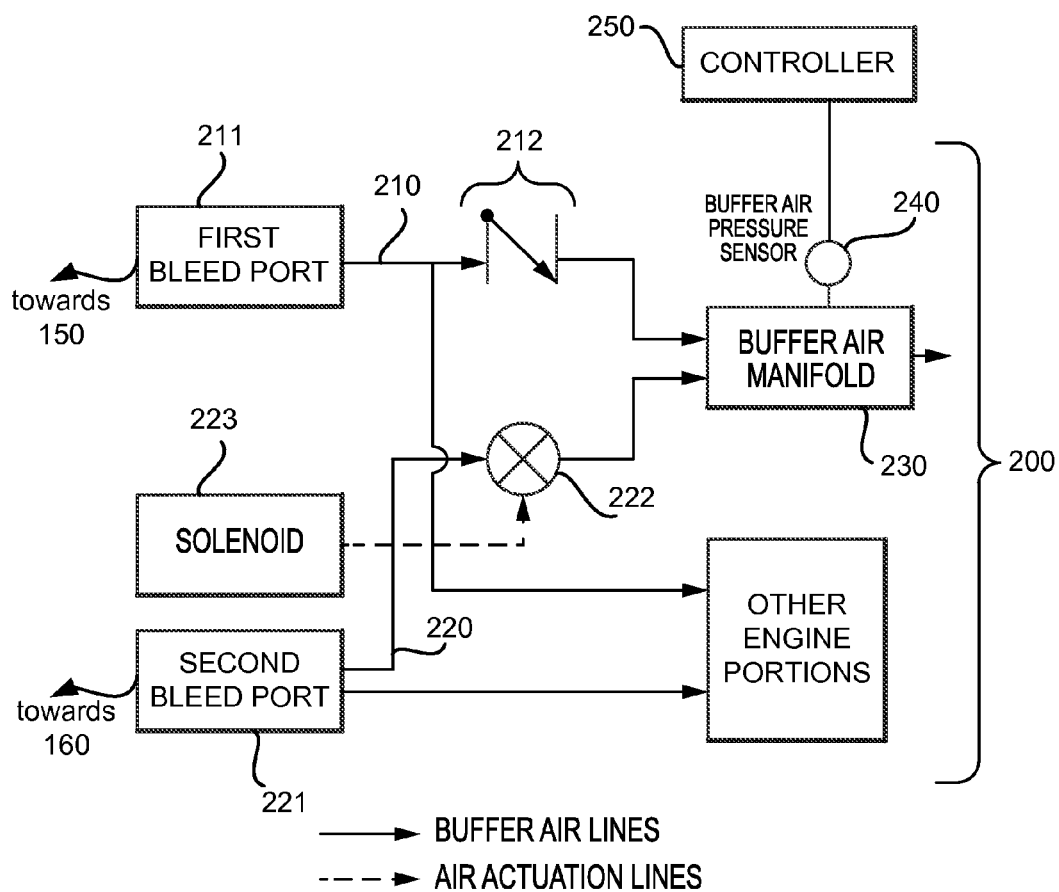
FIG. 2 illustrates a schematic diagram of a buffer air system in accordance with various embodiments.

Referring to FIG. 2, a gas turbine engine may further comprise a buffer air system 200. The buffer air system 200 may bleed air from portions of the engine and communicate it to other portions of the engine or release it externally from the engine. The buffer air system 200 may bleed buffer supply air 210, 220 from compressor sections 150, 160 (with momentary reference to FIG. 1) and communicate it into a buffer air manifold 230. A buffer air pressure sensor 240 may be configured to measure the pressure of buffer supply air 210, 220 in the buffer air manifold 230. Buffer supply air 210, 220 may be used to cool portions of the gas turbine engine 100 (with momentary reference to FIG. 1). Additionally, the buffer air system 200 may give the compressor sections 150, 160 (with momentary reference to FIG. 1) stability during starting and transient thrust operation of the gas turbine engine 100.

In various embodiments, the buffer air pressure sensor 240 may be in communication with a controller 250. In various embodiments, the controller may comprise a full authority digital engine control (FADEC) system. A controller may comprise a processor configured to implement various logical operations in response to execution of instructions, for example, instructions stored on a non-transitory, tangible, computer-readable medium.

A first buffer supply air 210 may be communicated from a low pressure compressor section 150 (with momentary reference to FIG. 1) through a first bleed port 211 in a buffer air system 200. A portion of the first buffer supply air 210 may be further communicated through a check valve 212 and into the buffer air manifold 230. The check valve 212 may be oriented such that, when the check valve 212 is not in a failed state, first buffer supply air 210 may be communicated in only one direction from a first side of the check valve to a second side of the check valve, for example, from the first bleed port 211 towards the buffer air manifold 230. The check valve 212 may be configured to open only when the air pressure on the first side of the check valve is greater than the air pressure on the second side of the check valve by an amount sufficient to actuate the check valve to an open position.

A second buffer supply air 220 may be communicated from a high pressure compressor section 160 (with momentary reference to FIG. 1) through a second bleed port 221 into a buffer air system 200. A portion of the second buffer supply air 220 may be further communicated through a shut off valve 222 and into a buffer air manifold 230. The position of the shut off valve 222 may be controlled by a solenoid valve 223 or any other suitable control apparatus. Upon suitable stimulus, the control apparatus may actuate the shut off valve 222 to an open position or to a closed position. If the shut off valve 222 is in an open position, the second buffer supply air 220 may be communicated through the shut off valve 222 and into the buffer air manifold 230; if the shut off valve 222 is in a closed position, the second buffer supply air 220 is prevented from being communicated into the buffer air manifold 230.

Figure 3:
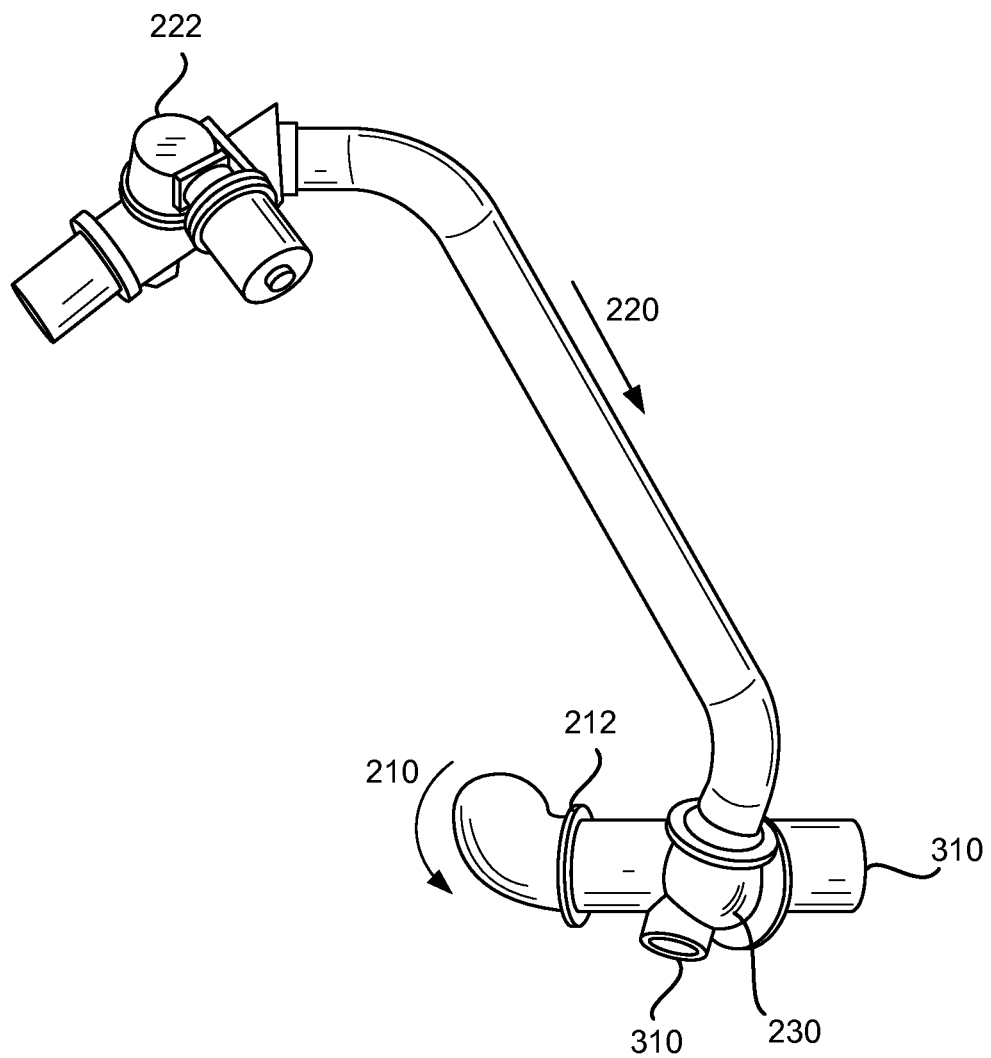
FIG. 3 illustrates a perspective view of a partial buffer air system in accordance with various embodiments.

Referring to FIG. 3, the first buffer supply air 210 may be communicated through the check valve 212 and into the buffer air manifold 230. The second buffer supply air 220 may be communicated through the shut off valve 222 and into the buffer air manifold 230, provided that the shut off valve 222 is in an open position. From the buffer air manifold 230, buffer supply air 210, 220 may be communicated through one or more exiting air passageways 310 to other portions of the buffer air system.

FIGS. 2 and 3 provide a general understanding of the operation of a buffer air system in a gas turbine engine, and are not intended to limit the disclosure. The present disclosure may extend to all types of applications and to all types of turbine engines, including turbofan gas turbine engines and turbojet engines.

As already described, a buffer air system may incorporate mechanical components including various types of valves. Such mechanical components may be prone to failure, and therefore, systems for detecting faults accurately and completely are desirable. Particularly in the context of gas turbine engines, accurate and complete fault detection systems are important. For example, in an aircraft, such systems can detect potential faults, which can be addressed before they lead to serious system failure and possible in-flight shutdowns, aborted take-offs, and delays or cancellations.

In a conventional gas turbine engine, buffer air system faults may occur when a shut off valve fails to open or close as commanded. Buffer air system faults may also occur when a check valve does not change state in response to the relative air pressure on either side of the check valve. Certain buffer air system faults may be detected through use of a threshold fault detection method of the present disclosure.

Figure 4:
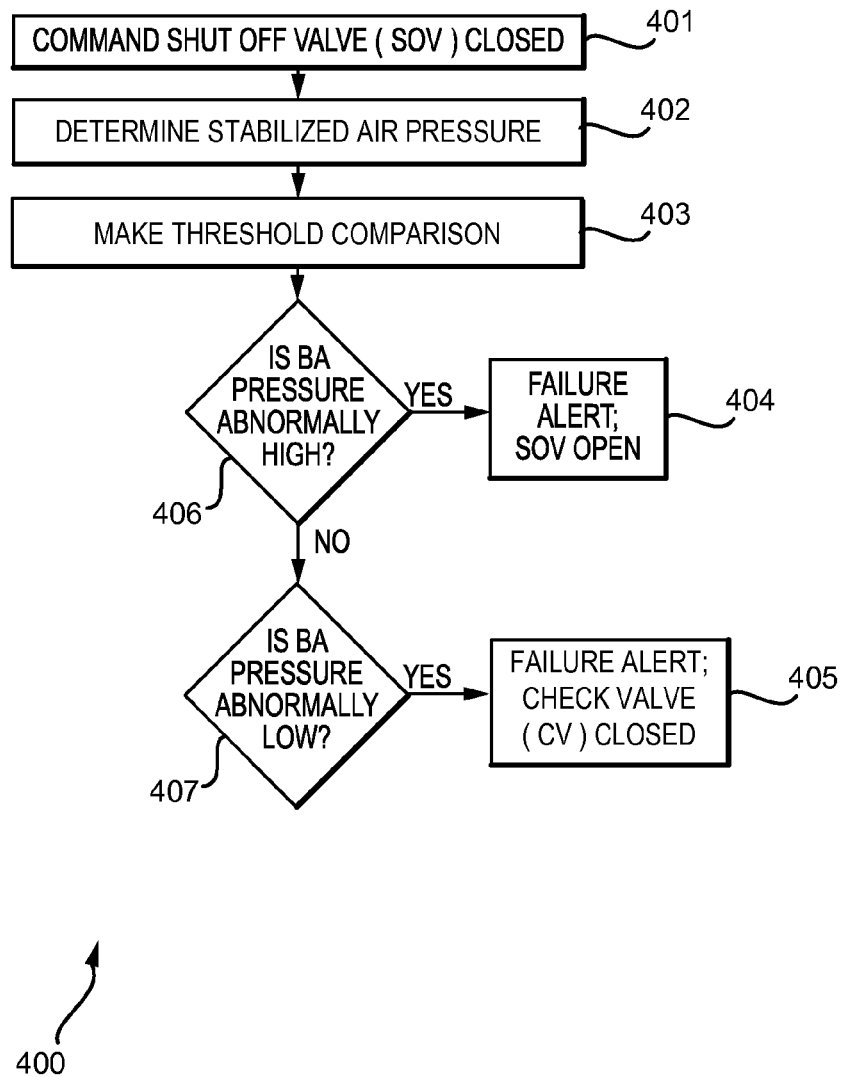
FIG. 4 illustrates a flowchart illustrating methods of detecting buffer air system faults in accordance with various embodiments.

For example, and with reference to FIG. 4, failure of a shut off valve in the open position may occur in response to the shut off valve being commanded closed (Step 401), yet the shutoff valve remains open. A method of fault detection by making a threshold comparison 400 may detect such a fault. Such a fault may result in an abnormally high air pressure in the buffer air manifold.

In response to the shut off valve being commanded closed, a stabilized air pressure may be determined by measuring the pressure of air (Step 402). The stabilized air pressure may comprise the air pressure in the buffer air manifold subsequent to a rapid and substantial increase or decrease in air pressure in response to the shut off valve being commanded open or closed. In various embodiments, the stabilized air pressure may fluctuate gradually or insubstantially, but may not rapidly or substantially increase or decrease.

A threshold comparison may be made between the stabilized air pressure and a predetermined maximum air pressure threshold (Step 403). In various embodiments, the predetermined maximum air pressure threshold may be determined or calculated at any time prior to making the threshold comparison (Step 403). According to an embodiment, the predetermined maximum air pressure threshold may be determined or calculated prior to operation of the aircraft. In an alternate embodiment, the predetermined maximum air pressure may be determined or calculated in situ, in response to particular operating conditions. If the stabilized air pressure exceeds the predetermined maximum air pressure threshold (Step 406), the shut off valve may be determined to have failed in an open state (Step 404).

For example, failure of a check valve in the closed position may occur in response to the check valve remaining closed in a situation where it is expected to open. With reference to FIG. 2, such a fault may occur when the pressure of air being communicated from the first bleed port 211 is greater than the air pressure of air in the buffer air manifold 230 by an amount sufficient to actuate the check valve 212 to an open position, yet the check valve 212 fails to open or to allow air to be communicated into the buffer air manifold 230.

With reference to FIG. 4, a method of fault detection by making a threshold comparison 400 may detect such a fault. Such a fault may result in an abnormally low air pressure in the buffer air manifold 230. In response to the shut off valve being commanded closed (Step 401), a stabilized air pressure may be determined by measuring the pressure of air (Step 402). A threshold comparison may be made between the stabilized air pressure and a predetermined minimum air pressure threshold (Step 403). In various embodiments, the predetermined minimum air pressure threshold may be determined or calculated at any time prior to making the threshold comparison (Step 403). In an embodiment, the predetermined minimum air pressure threshold may be determined or calculated prior to operation of the aircraft. According to an additional embodiment, the predetermined minimum air pressure threshold may be determined or calculated in situ, in response to particular operating conditions. If the stabilized air pressure is lower than the predetermined minimum air pressure threshold (Step 407), the check valve may be determined to have failed in a closed state (Step 405).

Methods for detecting failures in a valve-regulated pressurized system may rely on the measurement of transient air pressures in an enclosed space. In various embodiments, computer-readable media for carrying out the methods described herein are provided. Under normal operation, the pressure of buffer supply air in a buffer air manifold may change over a short duration of time after successful actuation of a shut off valve to an open position or to a closed position. For example, as the thrust of a gas turbine engine increases, the pressure of buffer supply air in the buffer air manifold may decrease sharply during actuation of the shut off valve to a closed position and increase gradually thereafter; as the thrust of a gas turbine engine decreases, the pressure of buffer supply air in the buffer air manifold may increase sharply during the successful actuation of the shut off valve to an open position, and may decrease gradually thereafter.

Various predetermined pressure differences may be measured or calculated based on normal engine operation under a variety of operating conditions. In various embodiments, the predetermined pressure difference may be determined or calculated at any time prior to making a transient comparison. For example, the predetermined pressure difference may be determined or calculated prior to operation of the aircraft. For example, the predetermined pressure difference may be determined or calculated in situ, in response to particular operating conditions.

Various valve faults may be detected through comparison of actual air pressure differences to predetermined pressure differences. For example, a shut off valve may fail by remaining in the open position in response to being commanded to close; a check valve may fail by remaining in the open position in response to a shut off valve being commanded to open. For example, a shut off valve may fail by returning to the closed position without being commanded to close; a check valve may fail by returning to the open position when a shut off valve is in an open position. Various transient fault detection methods may detect such faults, and may be employed to determine either that a valve is currently in a failed state or that a valve was previously in a failed state.

Figure 5:
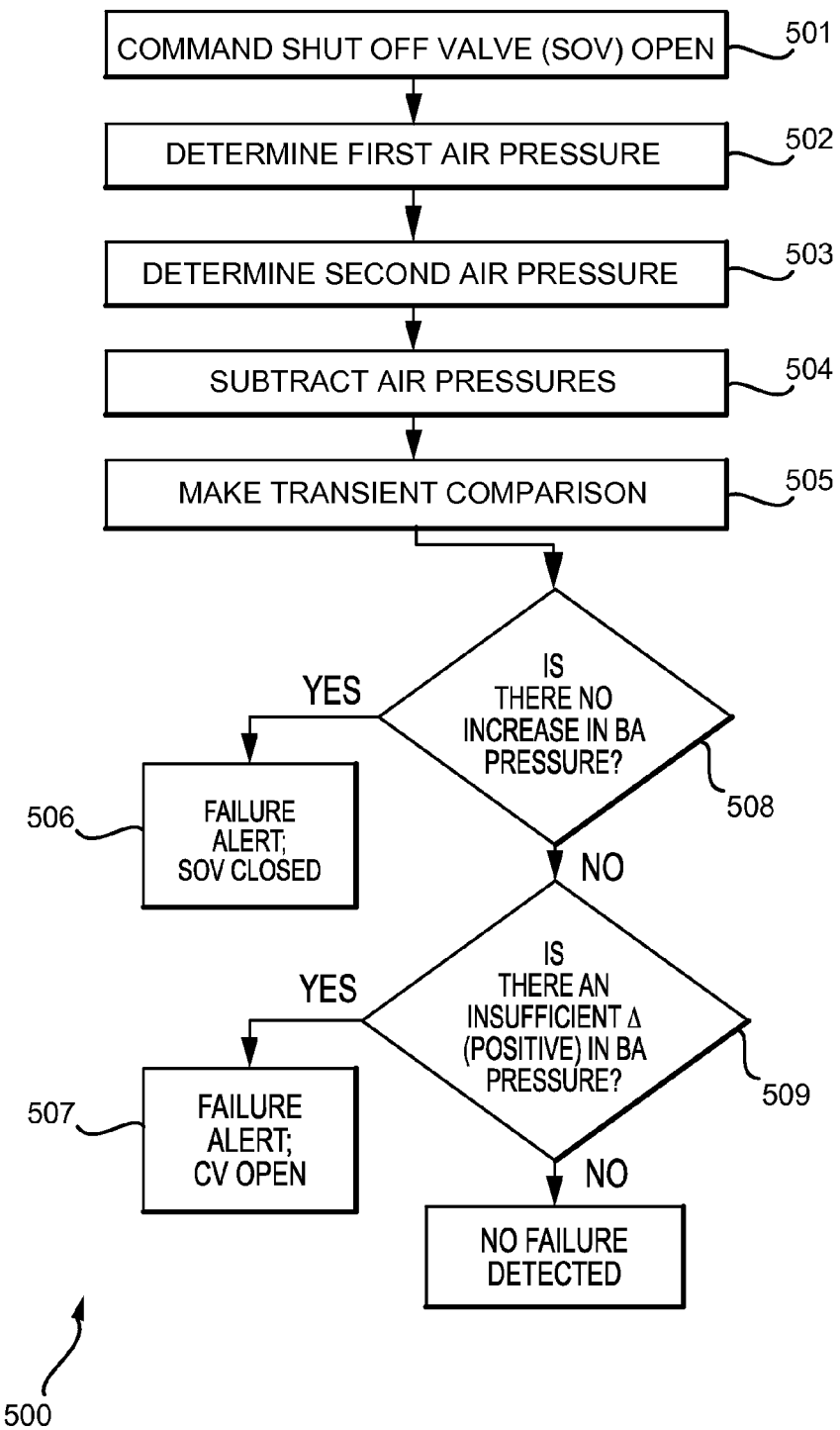
FIG. 5 illustrates a flowchart illustrating methods of detecting buffer air system faults in accordance with various embodiments.

With reference to FIG. 5, a method of fault detection by making a transient comparison 500 may be used to determine that a valve is currently in a failed state. For example, current failure of the check valve in the open position may be detected (Step 507) and current failure of the shut off valve in the closed position may be detected (Step 506). In various embodiments, a shut off valve may be commanded open (Step 501). A first air pressure may be measured at a first time (Step 502). Thereafter, a second air pressure may be measured at a second time (Step 503). The first air pressure and the second air pressure may be subtracted (Step 504) to obtain an actual pressure difference.

In various embodiments, a buffer air pressure sensor may be used to measure at least one of the first air pressure or the second air pressure. The first air pressure may be measured before, after, or simultaneously with actuation of the shut off valve to an open position. In various embodiments, the duration of time between measurement of the first air pressure and the second air pressure may be approximately five seconds. However, the duration of time between measurement of the first air pressure and the second air pressure may be any duration that is long enough to measure transient air pressure changes resulting from actuation of the shut off valve.

A transient comparison (Step 505) may be made between the actual pressure difference and a predetermined pressure difference. If the shut off valve is commanded open and the actual pressure difference is positive, but less than the predetermined pressure difference (Step 509), failure of the check valve in the open position may be determined (Step 507). In various embodiments, the predetermined pressure difference may exceed the actual pressure difference by a value within a predetermined range. In various embodiments, the predetermined range may represent known or calculated values signifying failure of the check valve in the open position. In various embodiments, the predetermined range may include values calculated as a percentage of the predetermined pressure difference. If the shut off valve is commanded open and the actual pressure difference is negligible or insignificant and less than the predetermined pressure difference (Step 508), failure of the shut off valve in the closed position may be determined (Step 506). In various embodiments, the predetermined pressure difference may exceed the actual pressure difference by a value greater than any value within the predetermined range.

Figure 6:
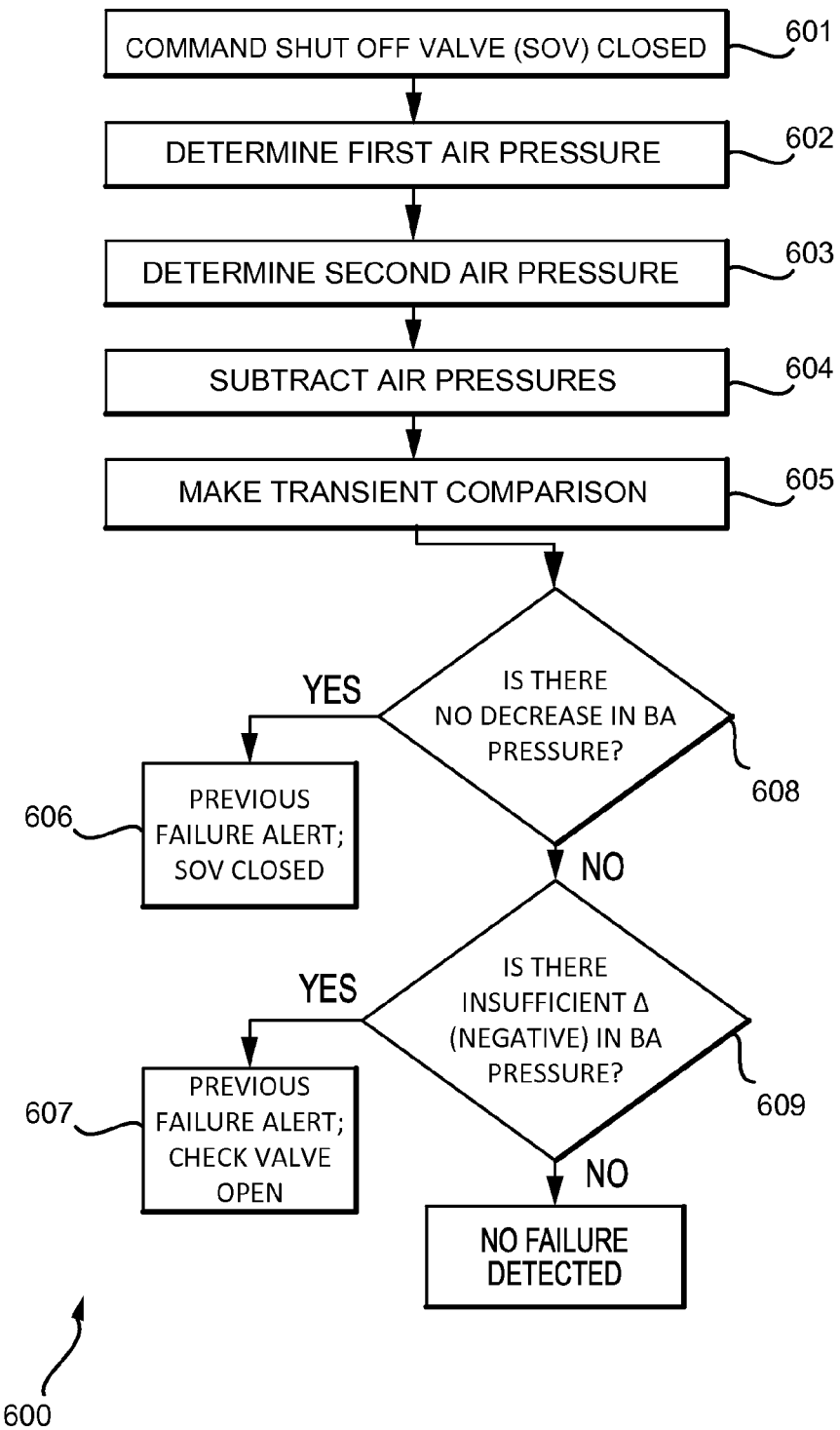
FIG. 6 illustrates a flowchart illustrating methods of detecting buffer air system faults in accordance with various embodiments.

With reference to FIG. 6, a method of fault detection by making a transient comparison 600 may determine that a valve was previously in a failed state. For example, previous failure of the check valve in the open position may be detected (Step 607) and previous failure of the shut off valve in the closed position may be detected (Step 606). In various embodiments, a shut off valve may be commanded closed (Step 601). A first air pressure may be measured at a first time (Step 602). Thereafter, a second air pressure may be measured at a second time (Step 603). The first air pressure and the second air pressure may be subtracted (Step 604) to obtain an actual pressure difference.

A transient comparison (Step 605) may be made between the actual pressure difference and a predetermined pressure difference. If the shut off valve is commanded closed and the actual pressure difference is negative, but less negative than the predetermined pressure difference (Step 609), a previous failure of the check valve in the open position may be determined (Step 607). In other words, a significant but smaller than expected decrease in buffer air pressure indicates that the check valve was in a failed open state before the shut off valve was commanded closed. If the shut off valve is commanded closed and the actual pressure difference is negligible or insignificant and less than the predetermined pressure difference (Step 608), failure of the shut off valve in the closed position may be determined (Step 606). In other words, an insignificant or negligible decrease in buffer air pressure indicates that the shut off valve was in a failed closed state before it was commanded closed.

Figure 7:
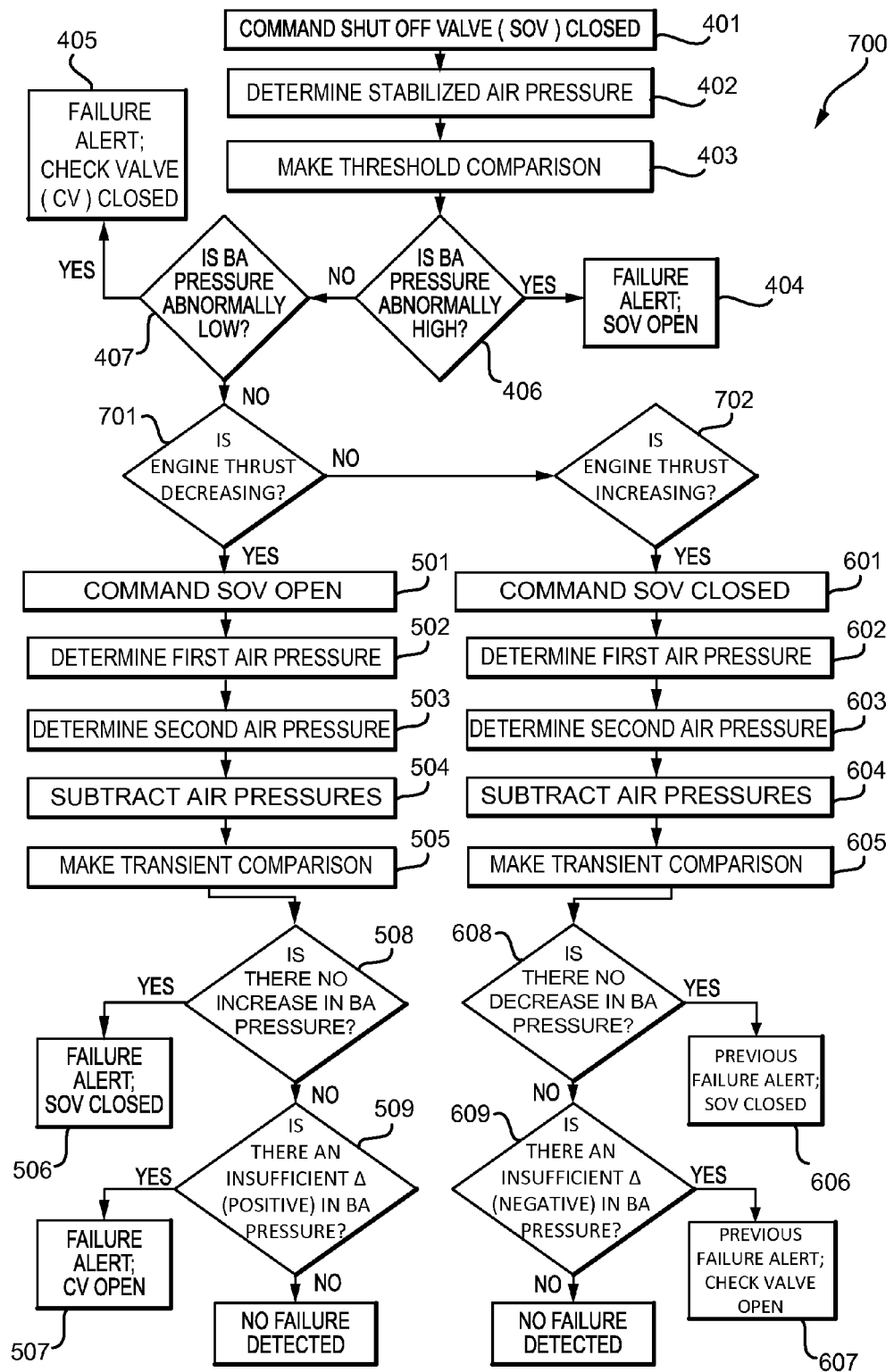
FIG. 7 illustrates a flowchart illustrating methods of detecting buffer air system faults in accordance with various embodiments.

With reference to FIG. 7, a method of fault detection 700 making a transient comparison may comprise a method of fault detection by making a threshold comparison 400 and at least one method of fault detection by making a transient comparison 500, 600. The method of making a threshold comparison may be performed before or after the method of making a transient comparison. In response to an increase in engine thrust (Step 701), a method of fault detection 700 may comprise a method of fault detection by making a transient comparison 500 and may be used to detect current valve faults, including a determination that the shut off valve is in a failed closed position or that the check valve is in a failed open position. In response to a decrease in engine thrust (Step 702), a method of fault detection 700 may comprise a method of fault detection by making a transient comparison 600 and may be used to detect previous valve faults, including a determination that, prior to the shut off valve being commanded closed (Step 601), the shut off valve was in a failed closed position or that, prior to the shut off valve being commanded closed (Step 601), the check valve was in a failed open position.

In various embodiments, a method of fault detection by making a threshold comparison may be used to determine that neither the check valve failed in a closed position nor the shut off valve failed in an open position; thereafter, a method of fault detection by making a transient comparison may be used to determine whether the check valve has failed in an open position or whether the shut off valve has failed in a closed position. In various embodiments, a method of fault detection by making a threshold comparison may be used to determine that a shut off valve has failed in an open position; thereafter, a method of fault detection by making a transient comparison may be used to determine that the check valve is in a normal state. In various embodiments, a method of fault detection by making a threshold comparison may be used to determine that a check valve has failed in a closed position; thereafter, a method of fault detection by making a transient comparison may be used to determine that the shut off valve is in a normal state.

In various embodiments, a method of fault detection by making a transient comparison may be used to determine that neither the shut off valve failed in a closed position nor the check valve failed in an open position; thereafter, a method of fault detection by making a threshold comparison may be used to determine whether the check valve has failed in a closed position or whether the shut off valve has failed in an open position. In various embodiments, a method of fault detection by making a transient comparison may be used to determine that a shut off valve has failed in a closed position; thereafter, a method of fault detection by making a threshold comparison may be used to determine that the check valve is in a normal state. In various embodiments, a method of fault detection by making a transient comparison may be used to determine that a check valve has failed in an open position; thereafter, a method of fault detection by making a threshold comparison may be used to determine that the shut off valve is in a normal state.

In various embodiments, methods for detecting various valve failures are provided. Detection of such a fault may be communicated to a controller. In various embodiments, the controller may comprise a full authority digital engine control (FADEC) system. A controller may comprise a processor configured to implement various logical operations in response to execution of instructions, for example, instructions stored on a non-transitory, tangible, computer-readable medium.

In various embodiments, a fault indicator may be activated in response to fault detection. The fault indicator may comprise a light or other indicator. The fault indicator may comprise a visual indicator, or an electronic or graphic display. In various embodiments, the fault indicator may be published to an aircraft airframe, to an aircraft avionics system, or to an engine operator.

Figure 8:
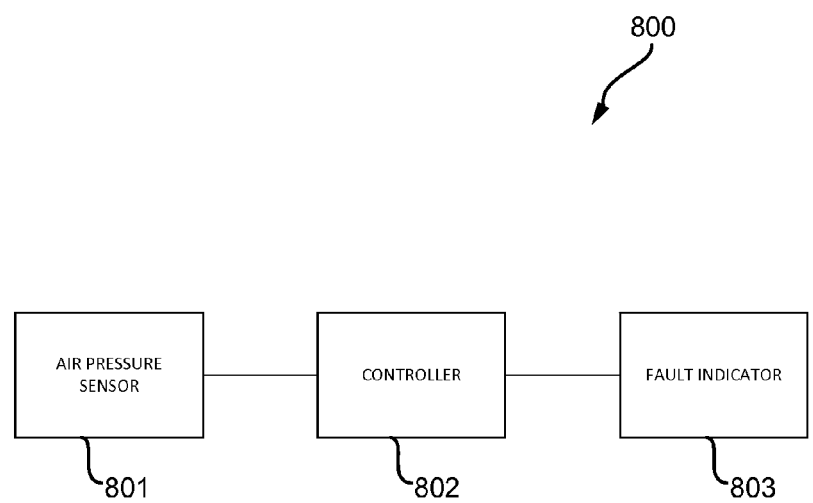
FIG. 8 illustrates a schematic diagram of a system for fault detection in accordance with various embodiments.

In various embodiments and with reference to FIG. 8, a system 800 for detecting failures in a valve-regulated pressurized system is provided. The system 800 may be configured to carry out some or all portions of the fault detection methods described herein. In various embodiments, the system 800 comprises an air pressure sensor 801 located in an enclosed space and capable of measuring the pressure of air in the enclosed space, and a controller 802 in communication with the air pressure sensor 801. The enclosed space may comprise a manifold, and a manifold may be incorporated into a valve-regulated pressurized system. In various embodiments, a manifold may be incorporated into a buffer air system, and a buffer air system may be incorporated into a gas turbine engine. In various embodiments the controller 802 may comprise a FADEC. The system may further comprise a fault indicator 803 in communication with the controller 802 and capable of indicating that a fault has been detected.

System program instructions may be loaded onto a non-transitory, tangible computer readable medium having instructions stored thereon that, in response to execution by a controller, cause the controller to perform various operations. The term "non-transitory" is to be understood to remove only propagating transitory signals per se from the claim scope and does not relinquish rights to all standard computer-readable media that are not only propagating transitory signals per se.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Methods, systems, and computer-readable media are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method for fault detection, comprising:
actuating a shut off valve to an open position;
determining a first air pressure, of air in an enclosed space, at a first time;
determining a second air pressure, of the air in the enclosed space, at a second time and in response to actuation of the shut off valve to the open position;
subtracting the first air pressure from the second air pressure to obtain an actual pressure difference;
making a transient comparison of the actual pressure difference to a predetermined pressure difference; and
determining, based on the transient comparison, whether at least one of the shut off valve and a check valve is in a failed state.

2. The method of claim 1, wherein:
the first time is at least one of during actuation and after actuation of the shut off valve to the open position; and
the second time occurs subsequent to the first time.

3. The method of claim 1, further comprising:
indicating, with a fault indicator, that at least one of the shut off valve and the check valve is in a failed state.

4. The method of claim 1, further comprising:
determining that the check valve is in the failed state, in response to making the transient comparison that the predetermined pressure difference exceeds the actual pressure difference by a value within a predetermined range.

5. The method of claim 4, further comprising:
actuating the shut off valve to a closed position;
determining a stabilized air pressure, of the air in the enclosed space, in response to actuation of the shut off valve to the closed position;
making a threshold comparison of the stabilized air pressure to a predetermined maximum air pressure;
determining that the shut off valve is in a normal state, in response to making the threshold comparison that the stabilized air pressure does not exceed the predetermined maximum air pressure.

6. The method of claim 5, wherein the enclosed space is defined by a manifold comprising at least two air input passageways, the airflow from each passageway being controlled by at least one of the shut off valve and the check valve.

7. The method of claim 1, further comprising:
determining that the shut off valve is in the failed state, in response to making the transient comparison that the predetermined pressure difference exceeds the actual pressure difference by a value greater than any value in a predetermined range.

8. The method of claim 7, further comprising:
actuating the shut off valve to a closed position;
determining a stabilized air pressure, of the air in the enclosed space, in response to actuation of the shut off vale to the closed position;
making a threshold comparison of the stabilized air pressure to a predetermined minimum air pressure;
determining that the check valve is in a normal state, in response to making the threshold comparison that the stabilized air pressure exceeds the predetermined minimum air pressure.

9. The method of claim 8, wherein the enclosed space is defined by a manifold comprising at least two air input passageways, the airflow from two such passageways being controlled by at least one of the shut of valve and the check valve.

10. A system for fault detection, comprising:
an air pressure sensor, located in an enclosed space;
a controller; and
a tangible, non-transitory memory configured to communicate with the controller, the tangible, non-transitory memory having instructions stored thereon that, in response to execution by the controller, cause the controller to perform operations comprising:
determining a first air pressure of air in the enclosed space at a first time;
determining a second air pressure of the air in the enclosed space at a second time,
subtracting the first air pressure from the second air pressure to obtain an actual pressure difference,
making a transient comparison of the actual pressure difference to a predetermined pressure difference, and
determining, based on the transient comparison, whether at least one of a shut off valve and a check valve is in a failed state.

11. The system of claim 10, wherein the enclosed space is defined by a manifold comprising at least two air input passageways, the airflow from each passageway being controlled by one of a shut off valve and a check valve.

12. The system of claim 11, wherein the controller comprises a full authority digital engine control system.

13. The system of claim 12, wherein the instructions cause the controller to perform operations comprising:
actuating the shut off valve to an open position;
determining a first air pressure, of air in the manifold, at a first time;
determining a second air pressure, of the air in the manifold, at a second time and in response to actuation of the shut off valve to the open position;
subtracting the first air pressure from the second air pressure to obtain an actual pressure difference;
making a transient comparison of the actual pressure difference to a predetermined pressure difference;
determining, based on the transient comparison, whether at least one of the shut off valve and the check valve is in a failed state.

14. The system of claim 12, wherein the instructions cause the controller to perform operations comprising:
actuating a shut off valve to an open position;
determining a first air pressure, of air in the manifold, at a first time;

determining a second air pressure, of the air in the manifold, at a second time and in response to actuation of the shut off valve to the open position;

subtracting the first air pressure from the second air pressure to obtain an actual pressure difference;

making a transient comparison of the actual pressure difference to a predetermined pressure difference;

determining, based on the transient comparison, whether at least one of the shut off valve and the check valve is in a failed state;

actuating the shut off valve to a closed position;

determining a stabilized air pressure, of the air in the manifold, in response to actuation of the shut off valve to the closed position;

making a threshold comparison of the stabilized air pressure to a predetermined maximum air pressure;

determining that the shut off valve is in a normal state, in response to making the threshold comparison that the stabilized air pressure does not exceed the predetermined maximum air pressure.

15. The system of claim 12, wherein the instructions cause the controller to perform operations comprising:

actuating a shut off valve to an open position;

determining a first air pressure, of air in the manifold, at a first time;

determining a second air pressure, of the air in the manifold, at a second time and in response to actuation of the shut off valve to the open position;

subtracting the first air pressure from the second air pressure to obtain an actual pressure difference;

making a transient comparison of the actual pressure difference to a predetermined pressure difference;

determining, based on the transient comparison, whether at least one of the shut off valve and the check valve is in a failed state;

actuating the shut off valve to the closed position;

determining a stabilized air pressure, of the air in the manifold, in response to actuation of the shut off valve to a closed position;

making a threshold comparison of the stabilized air pressure to a predetermined minimum air pressure;

determining that the shut off valve is in a normal state, in response to a threshold comparison wherein the stabilized air pressure does not exceed the predetermined minimum air pressure.

16. The system of claim 12, further comprising a fault indicator in communication with the controller.

17. An article of manufacture including a tangible, non-transitory computer-readable storage medium having instructions stored thereon for detecting a fault that, in response to execution by a controller, cause the controller to perform operations comprising:

receiving, by the controller, a first air pressure in an air passageway from an air pressure sensor at a first time;

receiving, by the controller and in response to actuation of a shutoff valve to a closed position, a second air pressure in the air passageway from the air pressure sensor at a second time;

subtracting, by the controller, the first air pressure from the second air pressure to obtain an actual pressure difference;

making a transient comparison, by the controller, of the actual pressure difference to a predetermined pressure difference;

determining, by the controller and based on the transient comparison, whether at least one of the shutoff valve and a check valve is in a failed state based upon the comparison.

18. The article of manufacture of claim 17, wherein the operations further comprise:

determining, by the controller, that the check valve is in a failed state, in response to making the transient comparison that the predetermined pressure difference exceeds the actual pressure difference by a value within a predetermined range.

19. The article of manufacture of claim 17, wherein the operations further comprise:

determining, by the controller, that the shut off valve is in a failed state, in response to making the transient comparison that the predetermined pressure difference does not exceed the actual pressure difference by a value greater than any value in a predetermined range.

20. The article of manufacture of claim 17, wherein the controller comprises a full authority digital engine control system.

* * * * *